United States Patent
Morita

(10) Patent No.: US 10,560,785 B2
(45) Date of Patent: Feb. 11, 2020

(54) ELECTRONIC DEVICE

(71) Applicant: Onkyo Corporation, Osaka (JP)

(72) Inventor: Mikio Morita, Osaka (JP)

(73) Assignee: Onkyo Corporation, Osaka (JP)

( * ) Notice: Subject to any disclaimer, the term of this patent is extended or adjusted under 35 U.S.C. 154(b) by 0 days.

(21) Appl. No.: 16/212,820

(22) Filed: Dec. 7, 2018

(65) Prior Publication Data
US 2019/0182605 A1   Jun. 13, 2019

(30) Foreign Application Priority Data

Dec. 11, 2017 (JP) .................................. 2017-236699

(51) Int. Cl.
| | |
|---|---|
| *H04R 19/04* | (2006.01) |
| *B32B 5/18* | (2006.01) |
| *B32B 27/06* | (2006.01) |
| *B32B 27/40* | (2006.01) |
| *H04R 3/00* | (2006.01) |
| *H04R 1/04* | (2006.01) |
| *H04R 1/02* | (2006.01) |
| *H04R 1/28* | (2006.01) |
| *H04R 1/40* | (2006.01) |

(52) U.S. Cl.
CPC .............. *H04R 19/04* (2013.01); *B32B 5/18* (2013.01); *B32B 27/065* (2013.01); *B32B 27/40* (2013.01); *H04R 1/025* (2013.01); *H04R 1/04* (2013.01); *H04R 1/2876* (2013.01); *H04R 3/00* (2013.01); *B32B 2250/40* (2013.01); *B32B 2266/0278* (2013.01); *B32B 2307/51* (2013.01); *B32B 2307/536* (2013.01); *B32B 2457/00* (2013.01); *H04R 1/406* (2013.01); *H04R 2201/003* (2013.01); *H04R 2201/029* (2013.01); *H04R 2201/401* (2013.01)

(58) Field of Classification Search
CPC . H04R 1/04; H04R 1/08; H04R 1/025; H04R 1/38; H04R 2201/003; H04R 2410/01; H04R 2410/03; H04R 2410/07
USPC ....... 381/174, 175, 355, 356, 359, 360, 361, 381/368, 369; 200/341, 342
See application file for complete search history.

(56) References Cited

U.S. PATENT DOCUMENTS

| | | | | |
|---|---|---|---|---|
| 5,615,273 A | * | 3/1997 | Lucey | H04R 1/083 381/160 |
| 5,756,359 A | * | 5/1998 | Habenstein | C07C 381/12 436/166 |
| 5,923,750 A | * | 7/1999 | Enting | H04M 1/20 379/433.02 |
| 6,128,393 A | * | 10/2000 | Kondo | H04R 9/08 381/355 |

FOREIGN PATENT DOCUMENTS

JP    2012-138682    7/2012

* cited by examiner

*Primary Examiner* — Huyen D Le
(74) *Attorney, Agent, or Firm* — Renner, Otto, Boisselle & Sklar, LLP

(57) ABSTRACT

An electronic device comprising: a substrate; a first elastic body which is positioned on one surface of the substrate; and a second elastic body which is positioned under the other surface of the substrate and is harder than the first elastic body, wherein the first elastic body and the second elastic body sandwich and hold the substrate.

8 Claims, 6 Drawing Sheets

ELECTRONIC DEVICE

CROSS-REFERENCE TO RELATED APPLICATIONS

This application claims priority to Japanese Application No. 2017-236699, filed Dec. 11, 2017, the entire contents of which are incorporated herein by reference.

FIELD

The present disclosure relates to an electronic device which includes a substrate.

BACKGROUND

In recent years, an electronic device which has a voice recognition function that a device can be operated by voice is appearing. In such an electronic device, a microphone for sound correction is provided. For miniaturization of the electronic device, as the microphone, a MEMS (Micro-Electrical-Mechanical) microphone is used. The MEMS microphone is mounted on a substrate. When the substrate on which the MEMS microphone is mounted vibrates, there is a problem that voice recognition accuracy drops by vibration.

In JP 2012-138682 A, it is attempted that transmission of vibration to the microphone unit is prevented by a first flexible member which is provided to adhere to the front surface side of the microphone unit and by a second flexible member which is provided to adhere to the back surface side of the microphone unit.

Herein, a switch (for example, a tact switch) is provided on the substrate. The substrate is pushed by switch push of a user. For this reason, for example, when the substrate is sandwiched and held by elastic bodies for vibration measure, it is necessary to operate without problem by push load caused by pushing the substrate. However, the above problem is not described and suggested because the switch is not mounted on the substrate of the microphone unit in JP 2012-138682 A.

SUMMARY OF THE DISCLOSURE

According to one aspect of the disclosure, there is provided an electronic device comprising: a substrate; a first elastic body which is positioned on one surface of the substrate; and a second elastic body which is positioned under the other surface of the substrate and is harder than the first elastic body, wherein the first elastic body and the second elastic body sandwich and hold the substrate.

DETAILED DESCRIPTION OF THE PREFERRED EMBODIMENTS

An objective of the present disclosure is to take measure of pushing a substrate and to prevent transmission of vibration to the substrate.

Figure 1:
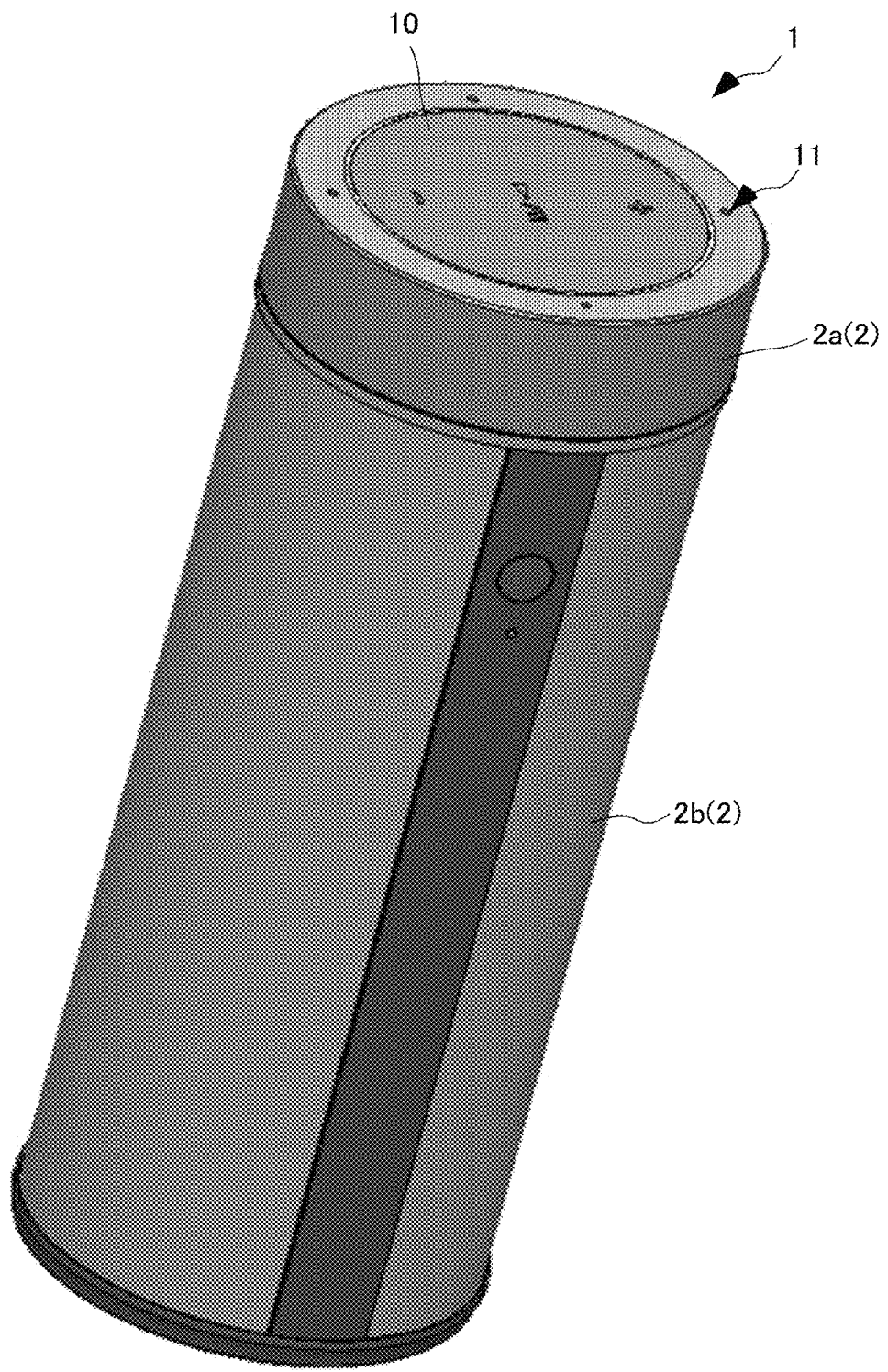
FIG. 1 is a perspective view illustrating the appearance of a speaker device according to an embodiment of the present disclosure.

An embodiment of the present disclosure is described below. FIG. 1 is a perspective view illustrating the appearance of a speaker device according to an embodiment of the present disclosure. The speaker device 1 (electronic device) includes a substantially cylindrical enclosure 2. The enclose 2 is made of resin, and has an enclosure 2a of upper part and an enclosure 2b of lower part. A not shown speaker unit is provided within the enclosure 2b.

Figure 2:
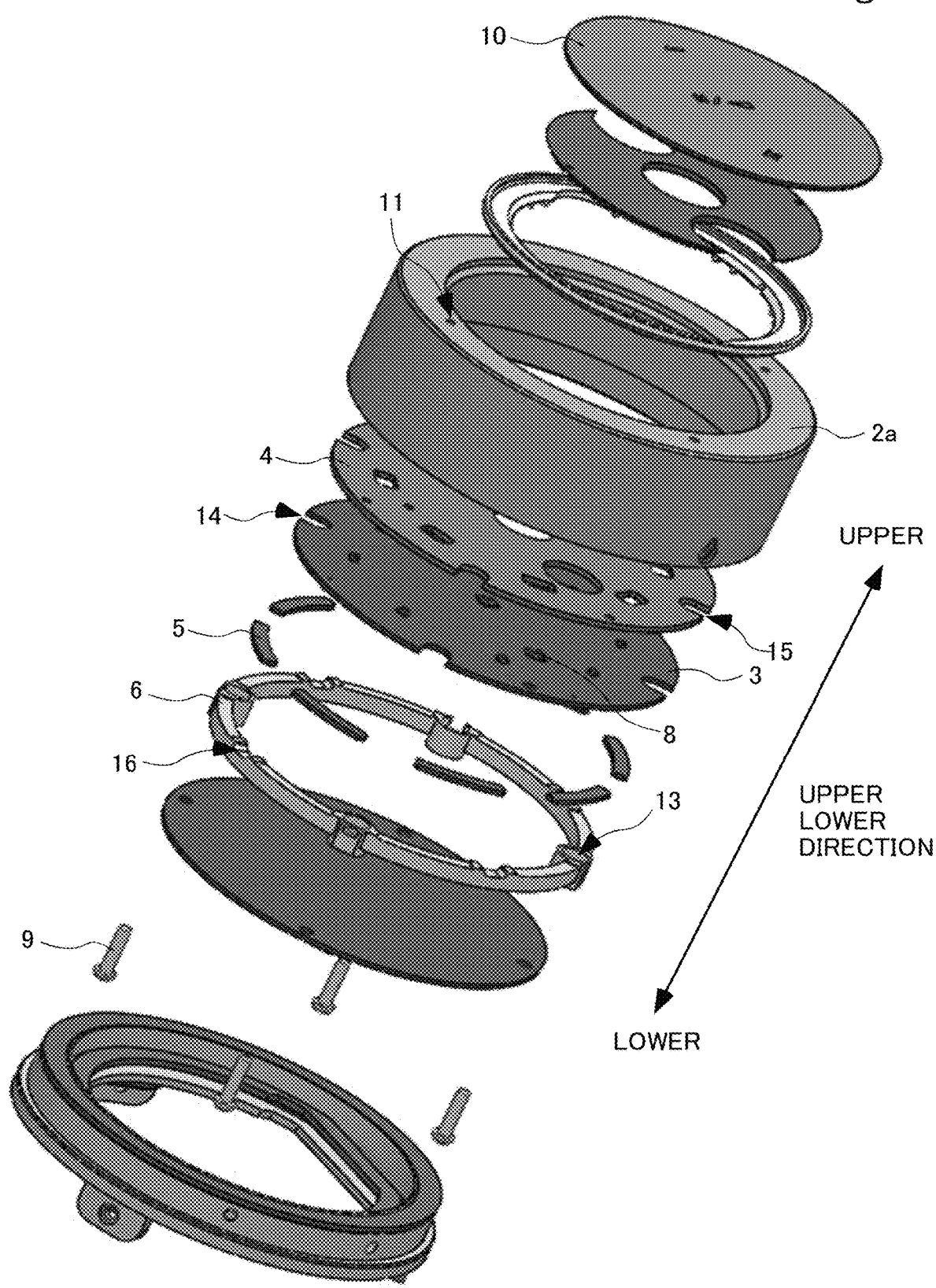
FIG. 2 is a disassembly perspective view illustrating parts within an enclosure.
Figure 3:
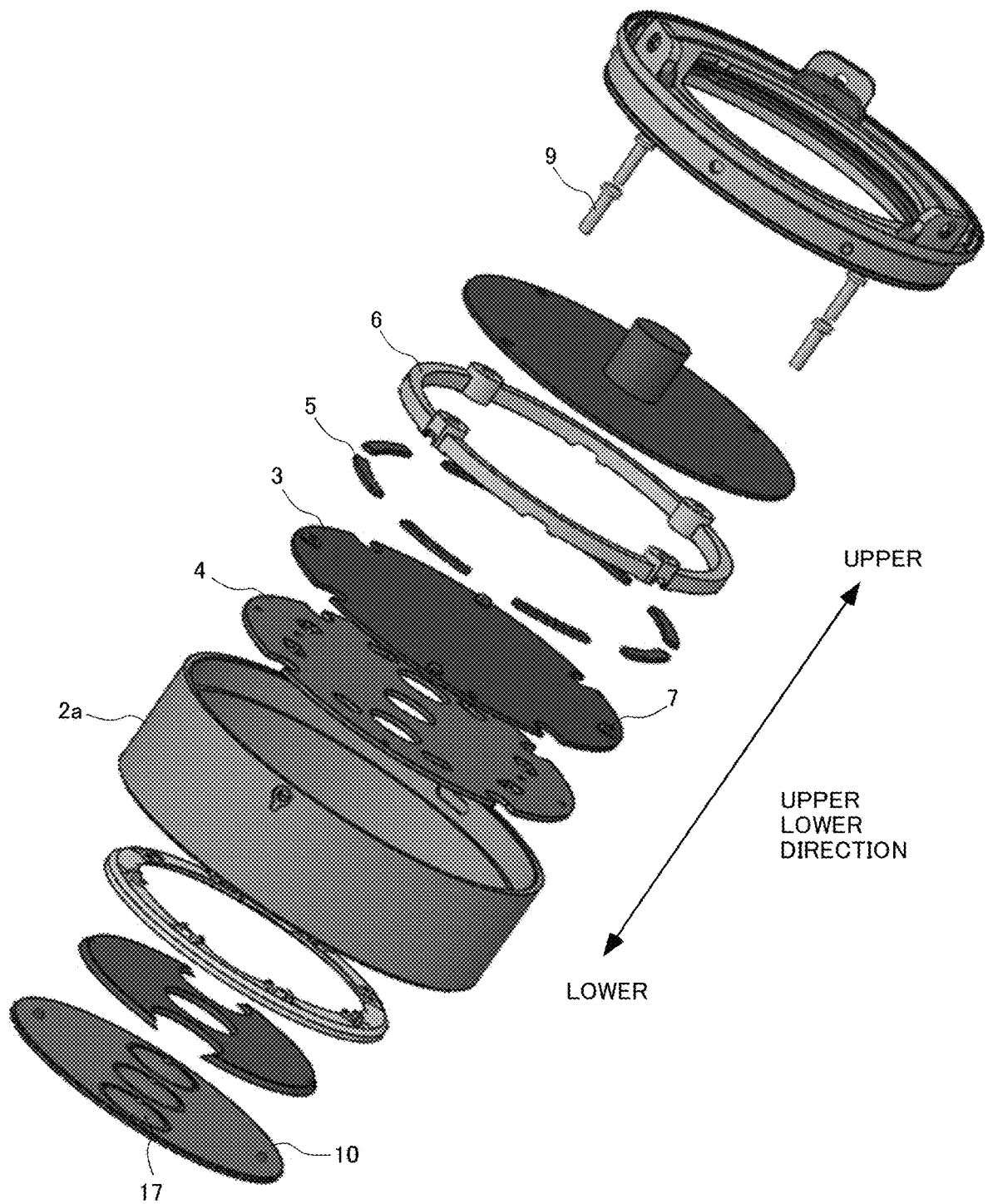
FIG. 3 is a disassembly perspective view illustrating parts within an enclosure.
Figure 4:
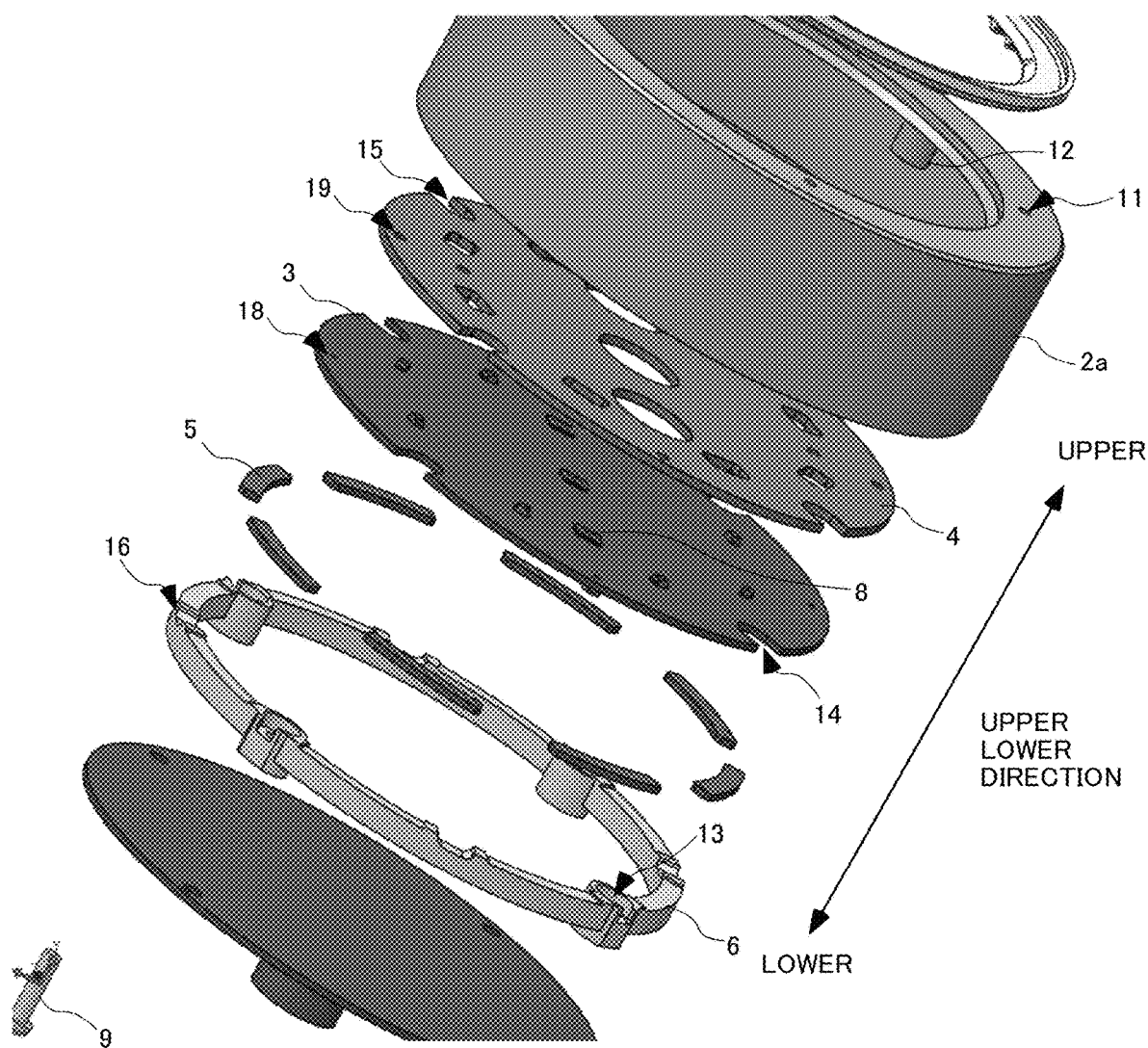
FIG. 4 is an enlarged view of FIG. 2.
Figure 5:
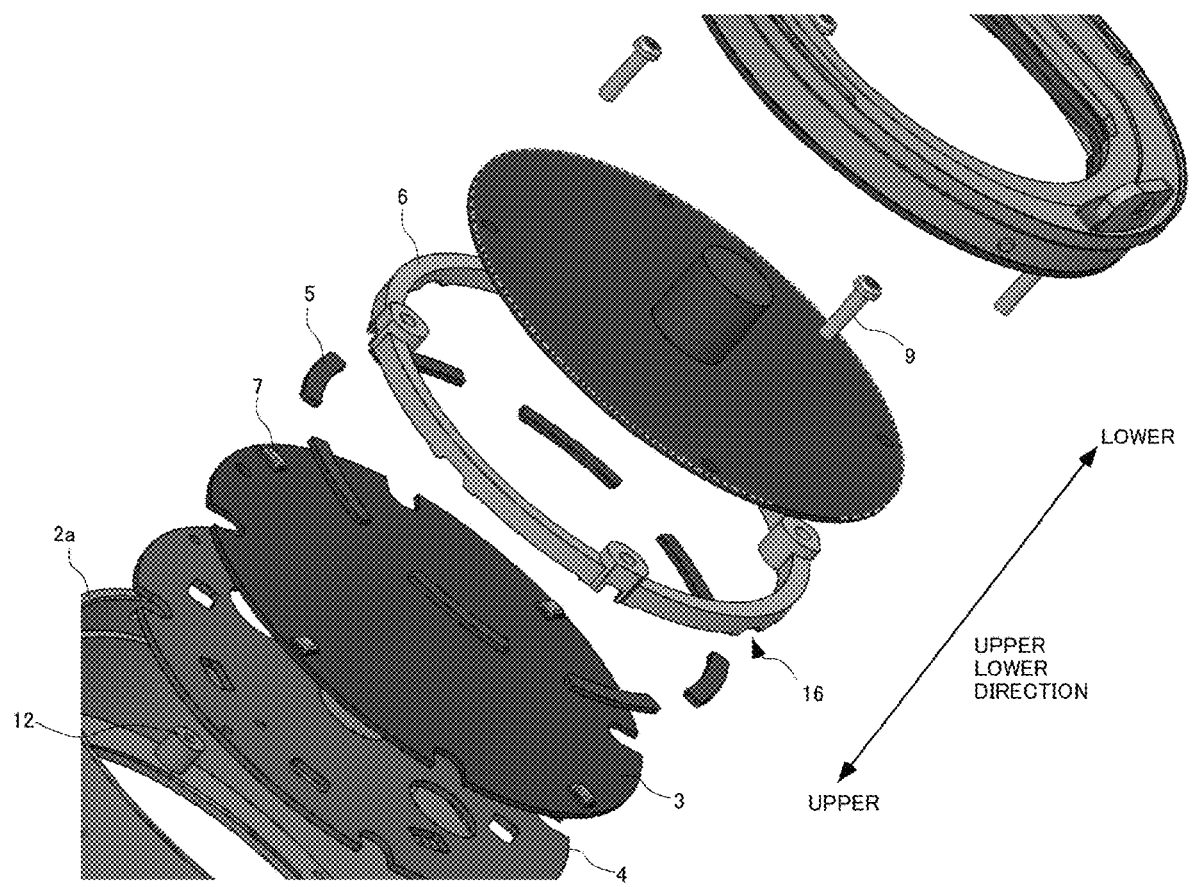
FIG. 5 is an enlarged view of FIG. 3.
Figure 6:
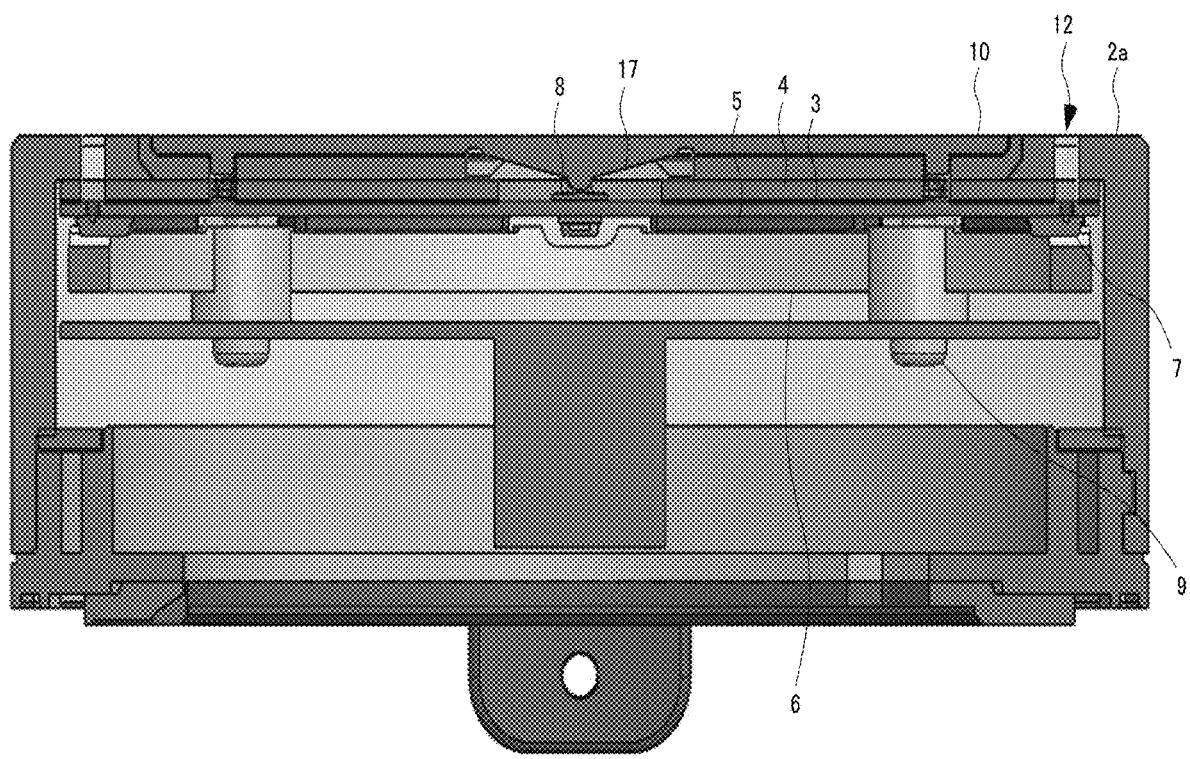
FIG. 6 is a cross-sectional view of the upper part of the speaker device.

Each of FIG. 2 and FIG. 3 is a disassembly perspective view illustrating parts within the enclosure 2a. In FIG. 2 and FIG. 3, up and down is reversed. FIG. 4 is an enlarged view of FIG. 2. FIG. 5 is an enlarged view of FIG. 3. FIG. 6 is a cross-sectional view of the upper part of the speaker device 1. As illustrated in figures, the speaker device 1 has the enclosure 2a, a substrate 3, elastic bodies 4 and 5, a support member 6, microphones 7, switches 8, bolts 9, and a sheet 10.

In an upper surface of the enclosure 2a, four holes 11 for sound correction by the microphone 7 are provided at intervals of 90 degrees on circumference. In the inside of the enclosure 2a, four bolt holes 12 are provided at intervals of 90 degrees on circumference.

The substrate 3 is formed in a substantially circular shape. On the upper surface (one surface) of the substrate 3, three switches 8 are provided. On the lower surface (the other surface) of the substrate 3, four microphones 7 are provided. In parts of the substrate 3 which face to insertion holes 13 of the below described support member 6, notches 14 are provided. The four notches 14 are provided at intervals of 90 degrees on circumference. At positions of the substrate 3 to which the four microphones 7 face, holes 18 for sound correction by the microphones 7 are provided. The four holes 18 are provided at intervals of 90 degrees on circumference.

The elastic body 4 (first elastic body) is a thin member of substantially circular shape, and is made of polyurethane form which has low resilience. For example, the elastic body 4 is made of PORON SR-S-40P. The elastic body 4 is positioned on the upper surface of the substrate 3. For example, in the elastic body 4, at positions to which the switches 8 and the other parts which are provided on the substrate 3 face, holes are provided. Therefore, the elastic body 4 is not positioned on the substrate 3 on which the switches 8 are provided. Further, in parts of the elastic body 4 which face to insertion holes 13 of the below described support member 6, notches 15 are provided. The four notches 15 are provided at intervals of 90 degrees on circumference. At positions of the elastic body 4 to which the four holes 18 which are provided on the substrate 3 face, holes 19 for sound correction by the microphones 7 are provided. The four holes 19 are provided at intervals of 90 degrees on circumference.

The elastic body 5 (second elastic body) is eight members which are positioned to face to a rim of the substrate 3. The elastic body 5 is positioned under the lower surface of the substrate 3. The elastic body 8 is hard type polyurethane form. Therefore, the elastic body 5 is harder than the elastic body 4. For example, the elastic body 5 is made of PORON H-48. The elastic body 5 is provided on the support member 6. Further, the elastic body 5 is not positioned under the substrate 3 on which the microphones 7 are provided.

Herein, the elastic body 4 is positioned on the upper surface of the substrate 3, the elastic body 5 is positioned under the lower surface of the substrate 3, and the elastic bodies 4 and 5 sandwich and hold the substrate 3. Further, the microphones 7 are held by the elastic bodies 4 and 5 via the substrate 3 because the microphones 7 are provided on the lower surface of the substrate 3.

The support member 6 is a substantially circular member, and is made of resin. In the support member 6, the four insertion holes 13 for inserting the bolts 9 are provided at intervals of 90 degrees. Further, in the support member 6, recesses 16 are provided at positions which face to the microphones 7 which are provided on the lower surface of the substrate 3. The four recesses 16 are provided at intervals of 90 degrees.

The microphones 7 are provided on the lower surface of the substrate 3. The four microphones 7 are provided on the substrate 3 at intervals of 90 degrees on circumference thereof. For example, each of the microphones 7 is a MEMS microphone. The switches 8 are provided on the upper surface of the substrate 3. The three switches 8 are provided on the center line of the substrate 3. For example, each of the switches 8 is a tact switch. For example, the switches 8 are switches for receiving up or down of volume, and replay/pause of replay. The sheet 10 is positioned on the upper surface of the elastic body 4. The sheet 10 is formed in a substantially circular shape. For example, the sheet 10 is made of silicon rubber (elastic member). On the lower surface (the other surface) of the sheet 10, three convex buttons 17 are provided on the center line. The buttons 17 face to the switches 8 which are provided on the upper surface of the substrate 3. Therefore, a user can operate the switches 8 by pushing the upper surface of the buttons 17.

In the speaker device 1, the enclosure 2a, the elastic body 4, the substrate 3, the elastic body 5, and the support member 6 are layered in this order. The four bolts 9 which are inserted to the insertion holes 13 of the support member 6 from lower direction are screwed to the bolt holes 12. As described above, in the substrate 3, the notches 14 are provided at positions which face to the insertion holes 13. Therefore, the substrate 3 is only held by the elastic bodies 4 and 5, and floats from the other members. Further, the buttons 17 and the switches 8 are separated by a predetermined distance. Further, the microphones 7 are sandwiched and held by the elastic bodies 4 and 5 via the substrate 3.

As described above, in the present embodiment, the switches 8 are provided on the substrate 3, and the substrate 3 (the switches 8) is pushed by the user. For this reason, in the present embodiment, the elastic body 5 which is harder than the elastic body 4 is provided under the lower surface of the substrate 3. Thus, operation can be performed by push load caused by pushing the substrate 3 without problem. Further, transmission of vibration to the substrate 3 can be prevented because the elastic bodies 4 and 5 sandwich and hold the substrate 3.

Further, in the present embodiment, the microphones 7 are provided on the lower surface of the substrate 3. Therefore, transmission of vibration to the microphones 7 is prevented because transmission of vibration to the substrate 3 is prevented.

Further, in the present embodiment, the sheet 10 is made of an elastic member. Further, the buttons 17 which is provided on the sheet 10 and the switches 8 are separated. For this reason, it is difficult to transmit vibration to the substrate 3.

Further, in the present embodiment, the elastic bodies 4 and 5 sandwich and hold the microphones 7 via the substrate 3. Therefore, the transmission of vibration to the microphones 7 can be prevented.

The embodiment of the present disclosure is described above, but the mode to which the present disclosure is applicable is not limited to the above embodiment and can be suitably varied without departing from the scope of the present disclosure as illustrated below.

In the above described embodiment, as an electronic device which includes a substrate, a speaker device is illustrated. Not limited to this, a device may be the other electronic device as long as the device has a substrate.

The present disclosure can be suitably employed in an electronic device which includes a substrate.

What is claimed is:

1. An electronic device comprising:
    a substrate having a switch on a first side of the substrate and a microphone on a second side of the substrate opposite the first side;
    a first elastic body which is positioned on the first side of the substrate; and
    a second elastic body which is positioned on the second side of the substrate and is harder than the first elastic body,
    wherein the first elastic body and the second elastic body sandwich and hold the substrate.

2. The electronic device according to claim 1,
    wherein the second elastic body is provided on a support member.

3. The electronic device according to claim 1,
    wherein the second elastic body is positioned to face a rim of the substrate.

4. The electronic device according to any one of claim 1 further comprising: a speaker unit.

5. The electronic device according to claim 1, further comprising a sheet comprised of an elastic material, wherein the sheet has a button that is engageable with the switch, and wherein an underside surface of the sheet is in contact with the first elastic body.

6. An electronic device comprising:
    a substrate;
    a first elastic body which is positioned on one surface of the substrate; and
    a second elastic body which is positioned under another surface of the substrate and is harder than the first elastic body;
    wherein the first elastic body and the second elastic body sandwich and hold the substrate;
    the electronic device further comprising: an enclosure which has a bolt hole,
    wherein the enclosure, the first elastic body, the substrate, the second elastic body, and a support member are layered in this order,
    in the support member, an insertion hole for inserting a bolt is provided,
    in part of the substrate which faces to the insertion hole, a notch is provided, and
    the bolt which is inserted to the insertion hole of the support member screws to the bolt hole.

7. An electronic device comprising:
    a substrate;
    a first elastic body which is positioned on one surface of the substrate; and
    a second elastic body which is positioned under another surface of the substrate and is harder than the first elastic body;

wherein the first elastic body and the second elastic body sandwich and hold the substrate;

the electronic device further comprising: a sheet which is made of elastic member;

wherein a button is provided on a surface of the sheet, the sheet is positioned on one surface of the first elastic body, and the button and a switch are separated from each other.

8. An electronic device comprising:

a microphone;

a first elastic body; and a second elastic body which is harder than the first elastic body, a substrate having a switch on a first side of the substrate and a microphone on a second side of the substrate opposite the first side;

wherein the first elastic body is positioned on the first side of the substrate;

wherein the second elastic body is positioned on the second side of the substrate; and wherein the first elastic body and the second elastic body sandwich and hold the substrate.

* * * * *